United States Patent
Barber (10) Patent No.: US 7,219,011 B1
(45) Date of Patent: May 15, 2007

(54) VERTICAL DEVIATION INDICATION AND PREDICTION SYSTEM

(75) Inventor: Sarah Barber, Robins, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 412 days.

(21) Appl. No.: 10/937,421

(22) Filed: Sep. 9, 2004

(51) Int. Cl.
  *G06F 19/00* (2006.01)
  *G01C 21/32* (2006.01)
(52) U.S. Cl. .................. 701/205; 701/4; 701/14; 701/211; 340/967; 340/974
(58) Field of Classification Search ............... 701/205, 701/202, 211, 4, 9, 14, 18; 340/953, 967, 340/970, 973, 974, 977; 715/700
See application file for complete search history.

(56) References Cited

U.S. PATENT DOCUMENTS

| | | | |
|---|---|---|---|
| 5,079,711 A | | 1/1992 | Lambregts |
| 5,445,021 A | * | 8/1995 | Cattoen et al. ............ 73/178 R |
| 5,614,897 A | * | 3/1997 | Durnford .................... 340/973 |
| 5,936,552 A | | 8/1999 | Wichgers |
| 6,107,943 A | | 8/2000 | Schroeder |
| 6,112,141 A | * | 8/2000 | Briffe et al. ................. 701/14 |
| 6,154,151 A | | 11/2000 | McElreath |
| 6,381,519 B1 | * | 4/2002 | Snyder ........................... 701/3 |
| 6,690,298 B1 | | 2/2004 | Barber |
| 6,720,891 B2 | | 4/2004 | Chen |

OTHER PUBLICATIONS

"Vertical situation display for improved flight safety and reduced operating costs", *Aero*, No. 20, Oct. 2002, pp. 3-11.

* cited by examiner

*Primary Examiner*—Tan Q. Nguyen
(74) *Attorney, Agent, or Firm*—Nathan O. Jensen; Kyle Eppele (57) ABSTRACT

A vertical deviation indicator and predictor includes a vertical deviation scale having a plurality of vertically spaced markers, one of the markers indicating the vehicle's present vertical position. Current vertical flight path segment symbols are selectively superimposable over the vertical deviation scale in accordance with the vehicle's current vertical flight path segment. Next vertical flight path segment symbols are selectively superimposable over the vertical deviation scale in accordance with the vehicle's next vertical flight path segment, the position thereof being determined by backward extrapolation of the next vertical flight path segment. Thus, the type and position of the current and next vertical flight path segment symbols on the vertical deviation scale provide situational awareness of the present vertical flight path deviation and an indication of an efficient and timely manner for intercepting the desired flight path.

19 Claims, 14 Drawing Sheets

VERTICAL DEVIATION INDICATION AND PREDICTION SYSTEM

BACKGROUND OF THE INVENTION

1. Field of the Invention

The present invention relates generally to aircraft instrumentation displays and more particularly to a vertical deviation indication and prediction system for providing situational awareness of the present vertical flight path and an efficient indication of a manner for intercepting the desired flight path.

2. Description of the Related Art

The depiction of lateral navigation (LNAV) information in the flight deck has matured significantly over recent years. It is fairly easy for pilots to visualize their position on the active (FMS) flight plan, understand where the next waypoint occurs, the direction of the next leg, and visualize any offsets when deviating. Furthermore, when navigating by heading/track, it is also a straightforward matter to manually create an intercept path to rejoin the flight plan.

The same cannot be said for Vertical Navigation (VNAV). One of the principal reasons that pilots become confused when using VNAV is that they do not have a comprehensive visualization tool for the vertical flight plan. Recent designs by air transport aircraft manufacturers have implemented vertical situation displays. However, many smaller/older aircraft do not possess anything more than simple vertical deviation indicators that show the current deviation from the vertical flight plan. No information is provided about the next vertical flight plan segment beyond the next flight plan waypoint.

An example, of a Vertical Situation Display (VSD) for use with Boeing aircraft is described in the article entitled, "Vertical Situation Display for Improved Flight Safety and Reduced Operating Costs", *Aero*, No. 20, October 2002, pages 3–11. The Boeing VSD works in conjunction with the terrain-mapping feature of the terrain awareness and warning system (TAWS), a Honeywell enhanced ground proximity warning system. It provides an intuitive presentation of the vertical situation relative to the surrounding terrain and the final approach decent path. In addition to terrain alerting, the TAWS provides a lateral, or top-down, view of terrain. The VSD depicts a profile, or side view, of terrain and flight path data.

U.S. Pat. No. 6,720,891, issued to Chen et al., entitled, "Vertical Situation Display Terrain/Waypoint Swath, Range to Target Speed, and Blended Airplane Reference" discloses a flight information display for the flight deck of an aircraft showing a pictorial side view of the flight path or the area directly in front of the aircraft area having a selected distance of at least 0.5 nautical miles, comprising (a) a pictorial representation to scale of the profile of the highest elevations of a swath of terrain along said path or area, (b) an icon positioned on the left or right side of the display representing the aircraft, the altitude of which is to scale with the height of the terrain, and (c) an altitude reference scale; wherein the width of the swath is at least 0.1 nautical miles and no greater than the distance of the minimum accuracy of the means for determining the aircraft's location.

U.S. Pat. No. 5,936,552, issued to Wichgers et al., entitled, "Integrated Horizontal and Profile Terrain Display Format For Situational Awareness", discloses a visual display format for a terrain situational awareness system comprising a horizontal terrain elevation view and a profile terrain elevation view of potential terrain hazards integrated onto a single display.

U.S. Pat. No. 6,154,151, issued to Wichgers et al., entitled, "Integrated Vertical Situation Display for Aircraft", discloses an integrated vertical situation display (IVSD) for an aircraft, and method of displaying vertical situation information. The IVSD includes an electronic display for displaying the vertical situation of the aircraft, input interfaces for receiving vertical profile information signals, and a processing circuit for reading the information signals and generating display signals applied to the display therefrom. The display has a vertical profile view area to display the vertical situation in front of, above, and below the aircraft. The information sources may include a flight management system, traffic alert and collision avoidance system (TCAS) and a ground proximity warning system. Vertical situations are displayed by visual indicia representing, for example, aircraft position, path angle, flight path, waypoints, TCAS targets, altitude preselect, decision height, runway, ground contour, and vertical speed. The integrated display minimizes the cognitive workload of the operator in assessing the total vertical situation.

U.S. Pat. No. 6,154,151, issued to Barber et al., entitled, "Enhanced Vertical Terrain Profile Display", discloses a flight display for use in an avionics system that has a visual display format to show an enhanced vertical situation of an aircraft. Included is a vertical terrain profile display that displays terrain in front of the aircraft over a selected range and a selected swathe width. The vertical terrain profile display shows a side-on terrain profile view with a digital display of the selected swathe width and a display of range in front of the aircraft. A plan view of the aircraft position is included that shows swathe lines on either side of an aircraft to show the selected swathe width. A means for selecting the swathe width by the pilot is provided. The vertical terrain profile display may be changed into a end-on vertical terrain profile view over the selected swathe width. The end-on terrain profile view has a digital display of the selected range and a digital display of the selected swathe width on each side of the aircraft.

As will be disclosed below, the present invention affords a simple method and symbology for providing the pilot with much improved situational awareness, regarding the position of the airplane relative to the current vertical flight plan segment, and the position relative to an extension (rearwards extrapolation) of the next vertical flight plan segment.

SUMMARY OF THE INVENTION

In a broad aspect, the present invention is a vertical deviation indication and prediction system for vertical navigation situational awareness of a vehicle. The vertical deviation indication and prediction system includes a vertical deviation indicator and predictor that includes a vertical deviation scale having a plurality of vertically spaced markers, one of the markers indicating the vehicle's present vertical position. A plurality of current vertical flight path segment symbols are selectively superimposable over the vertical deviation scale in accordance with the vehicle's current vertical flight path segment. A plurality of next vertical flight path segment symbols are selectively superimposable over the vertical deviation scale in accordance with the vehicle's next vertical flight path segment, the position thereof being determined by backward extrapolation of the next vertical flight path segment. Thus, the type and position of the current and next vertical flight path segment symbols on the vertical deviation scale provide situational awareness of the present vertical flight path deviation and an indication of an efficient and timely manner for intercepting the desired flight path.

DETAILED DESCRIPTION OF THE INVENTION

Figure 1A:
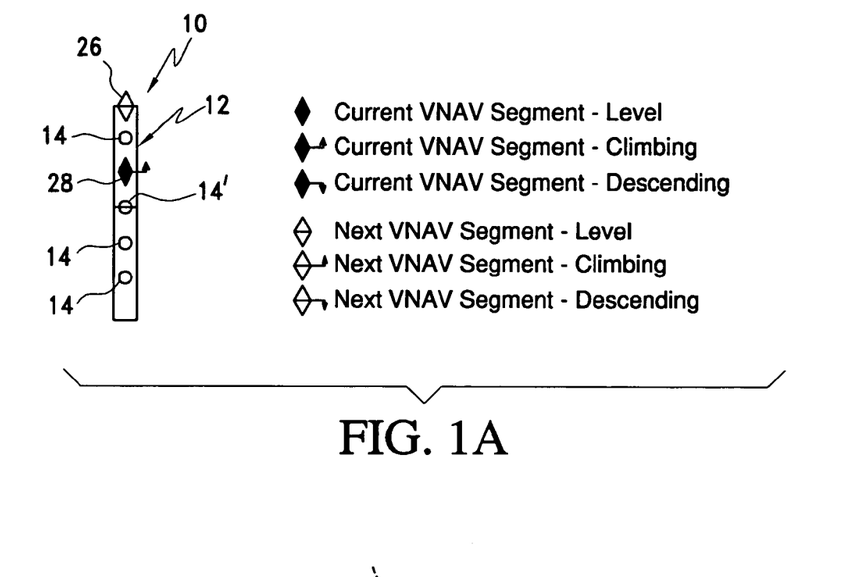
FIG. 1A illustrates the vertical deviation indicator and predictor of the vertical deviation and indication system of the present invention and a legend showing the symbology used therefor at a first airplane position.

Referring now to the drawings and the characters of reference marked thereon, FIG. 1A illustrates a preferred embodiment of the vertical deviation indicator and predictor of the present invention, designated generally as 10. The vertical deviation indicator and predictor 10 provides information regarding the following questions:

1) Where is my current VNAV flight plan segment relative to me?

2) Is my current VNAV flight plan segment level, climbing, or descending?

3) Where is my next VNAV flight plan segment relative to me?

4) Is my next VNAV flight plan segment level, climbing, or descending?

To accomplish the above, a vertical deviation scale 12 is used that has a plurality of vertically spaced markers 14. Preferably, a centrally positioned marker 14' is utilized to indicate the vehicle's present vertical position. The symbology shown in FIG. 1A is preferably utilized. These symbols are superimposable over the vertical deviation scale 12. The filled diamonds depict the relative position of the current VNAV flight plan segment to the airplane. These filled diamonds may be of a desired color such as magenta. (This color convention emphasizes that the VNAV path is FMS derived.) The presence (or absence) of the (upward or downward) trend line indicates whether the segment is level, climbing, or descending.

Similarly, the non-filled diamonds depict the relative position of the "extension" of the next VNAV flight plan segment relative to the airplane. This "extension" will only be extrapolated backwards to the FROM waypoint. In other words, if the TO waypoint is waypoint "N", the next VNAV flight plan segment (after the TO waypoint) will be extrapolated backwards to waypoint "N–1". These non-filled diamonds may be of a desired color, such as green. Although the use of diamonds has been shown, it is understood that other symbols could easily be utilized such as stars.

As will be discussed in greater detail below, situations indicative of a potential need for corrective action by the pilot are indicated when the airplane (center of the deviation scale) is not located between the current segment and next segment VNAV deviation symbols.

Generally, the indicator and predictor 10 shown in FIG. 1A is used in aircraft that do not possess a vertical flight profile viewer. The primary basis of the invention was to provide VNAV path awareness for airplanes that do not have the luxury of the vertical flight profile viewer. However, if desired a vertical indication and prediction system of an aircraft may include a vertical deviation indicator and predictor 10 in conjunction with a vertical flight profile viewer, designated generally as 16, in FIG. 1B. The vertical flight profile viewer 16 includes a graphical representation of the desired vertical flight path of the vehicle; and a graphical representation of backward extrapolations (in hatched lines) of each of the desired vertical flight path segments.

Figure 1B:
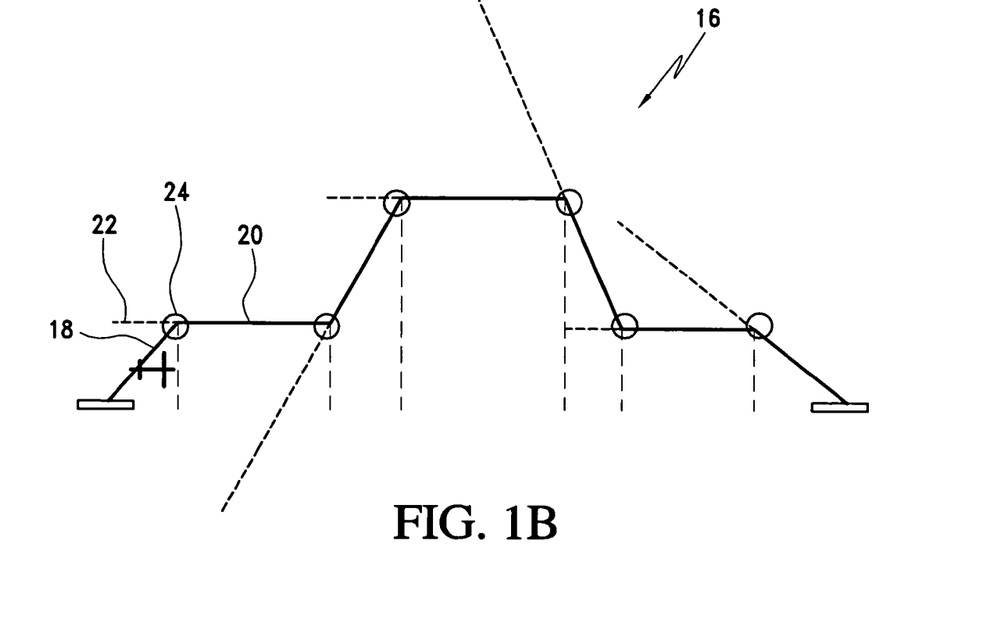
FIG. 1B illustrates a vertical flight profile viewer of the vertical deviation and indication system, illustrating the flight profile corresponding to the vertical deviation indicator and predictor of the FIG. 1A example.

In the FIGS. 1A, 1B depiction, the airplane is climbing out after takeoff. The current VNAV flight plan segment 18 is above the airplane, and climbing. The next segment 20 is level, and the extension 22 of this segment is also above the airplane. If the airplane flies level, or continues to climb at a slower rate than the VNAV segment 18, the airplane will not intercept the segment 18 before the next waypoint 24. This is easily interpreted by the airplane (center 14' of the deviation scale) not being between the two VNAV deviation symbols 26, 28.

Figure 2A:
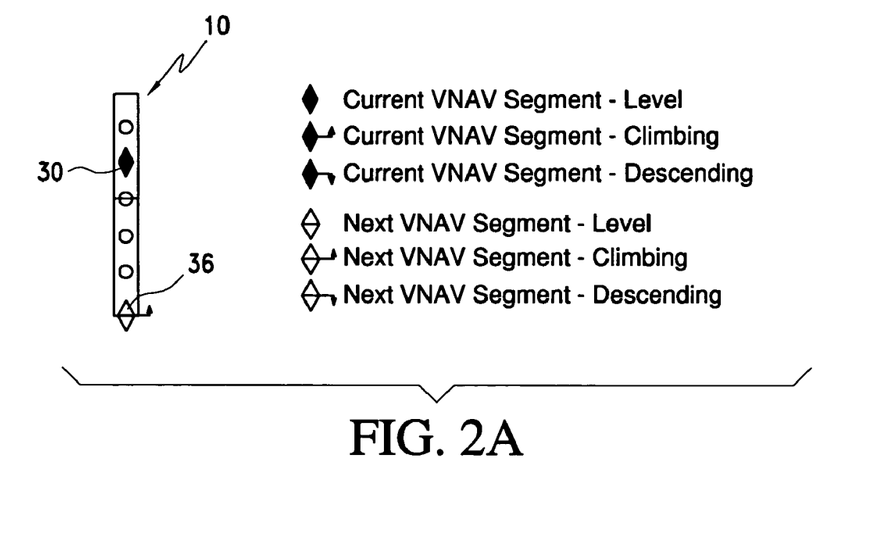
FIG. 2A illustrates the vertical deviation indicator and predictor of the vertical deviation and indication system of the present invention and a legend showing the symbology used therefor at a second airplane position.
Figure 2B:
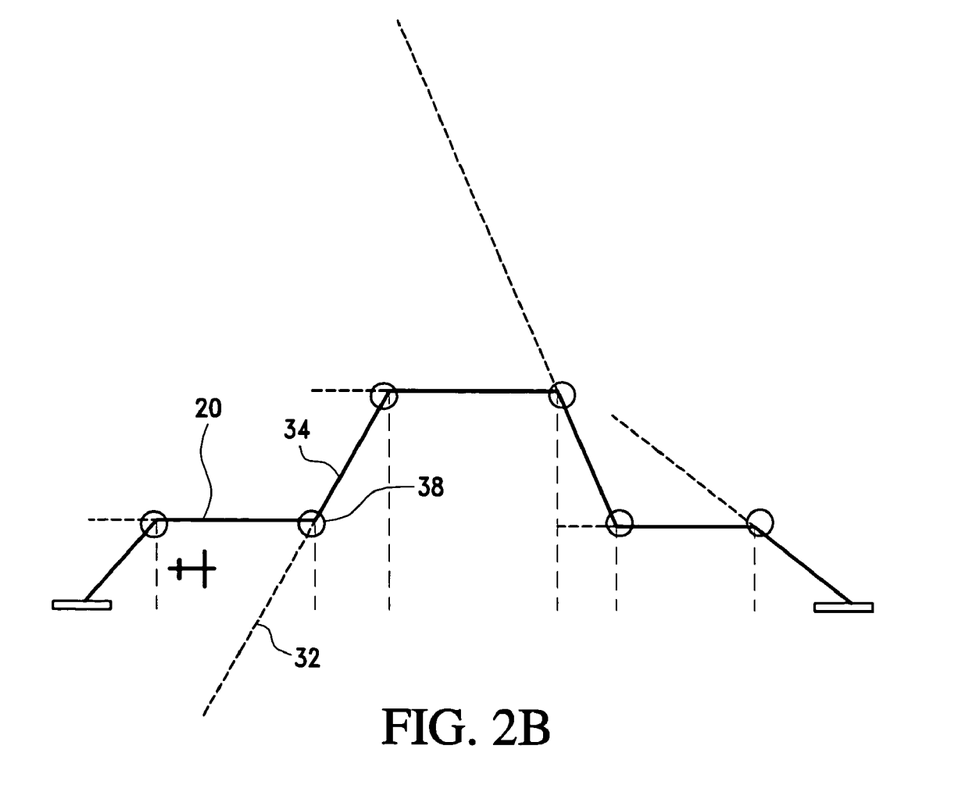
FIG. 2B illustrates a vertical flight profile viewer of the vertical deviation and indication system, illustrating the flight profile corresponding to the vertical deviation indicator and predictor of the FIG. 2A example.

Referring now to FIGS. 2A and 2B, the airplane has leveled off below the current VNAV segment 20. The indicator (i.e. symbol 30) shows that the current segment 20 is level. The extension 32 of the next segment 34 is currently below the airplane, and is climbing. If the airplane continues flying level, it will intercept the next segment extension 32. This will be indicated by the airplane being between the two deviation symbols 30, 36, and the diamond symbol 36 slowly rising towards the airplane. When the airplane intercepts the next segment extension 32, as long as it can climb at the same rate as the extension, it will be able to meet any constraints at the next waypoint 38 and not have to adjust the climb rate as it passes through the next waypoint. In other words, being able to intercept the next segment extension allows the airplane to set up a climb (or descent) profile that will not require significant changes as the airplane passes through the TO waypoint.

Figure 3A:
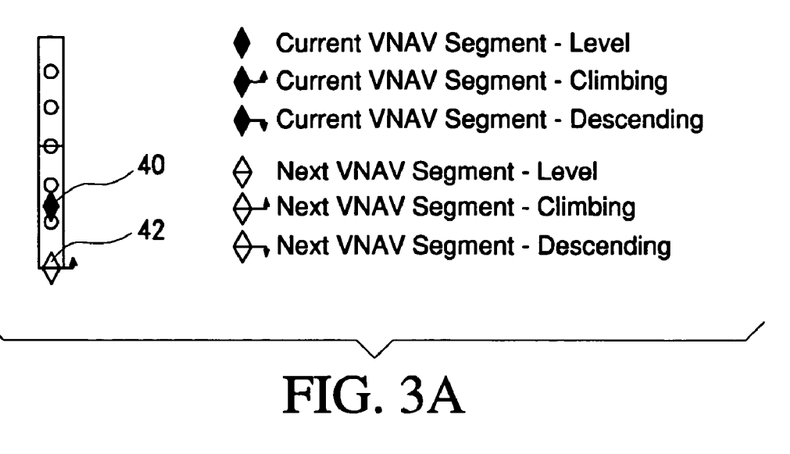
FIG. 3A illustrates the vertical deviation indicator and predictor of the vertical deviation and indication system of the present invention and a legend showing the symbology used therefor at a third airplane position.
Figure 3B:
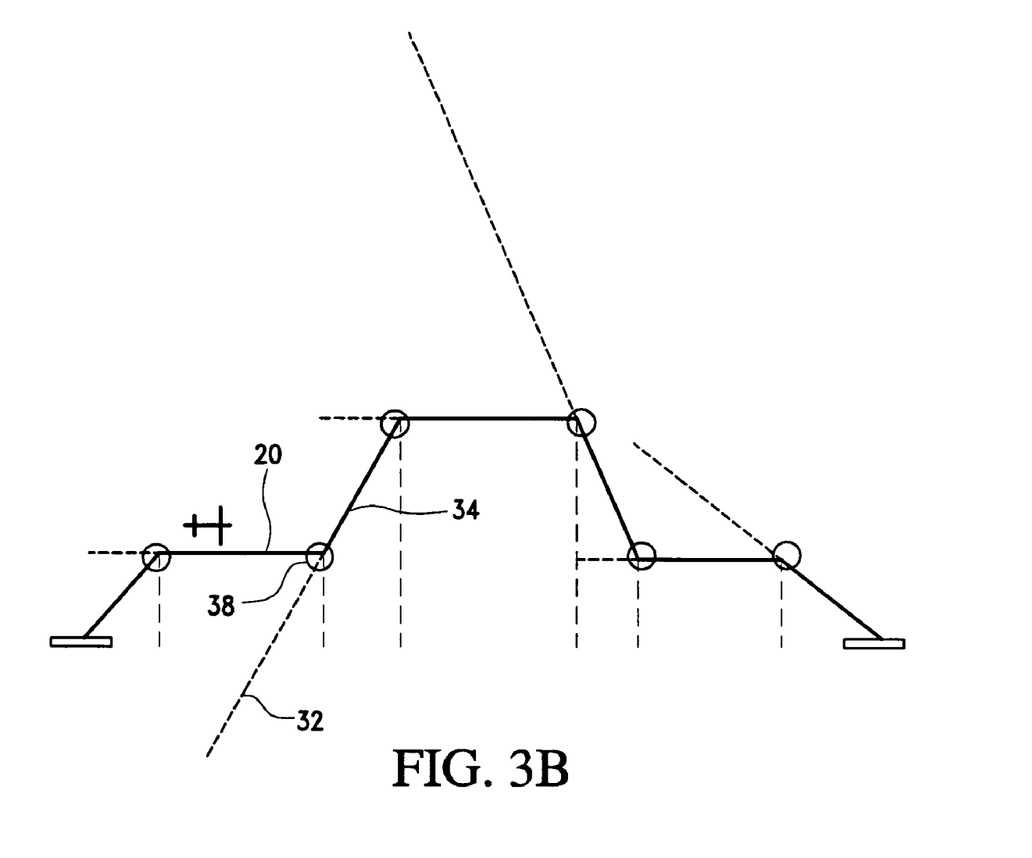
FIG. 3B illustrates a vertical flight profile viewer of the vertical deviation and indication system, illustrating the flight profile corresponding to the vertical deviation indicator and predictor of the FIG. 3A example.

Referring now to FIGS. 3A and 3B, the airplane has leveled off above the current VNAV segment 20. The indicator (i.e. symbol 40) shows that the current segment is level. The extension 32 of the next segment is also below the airplane, and climbing. If the airplane continues flying level, it will not intercept the current segment 20, or next segment extension 32, before reaching the next waypoint 38. This is indicated by the airplane being above the two deviation symbols 40, 42, and the diamond symbol 42 slowly rising towards the current segment 20. At the next waypoint 38, the two symbols will intercept (overlay) below the airplane.

Figure 4A:
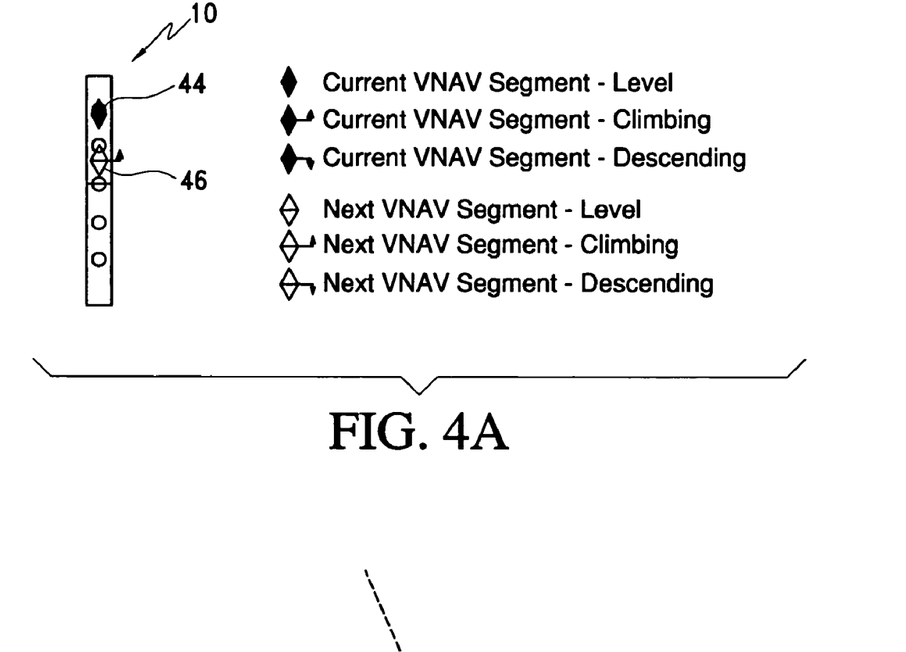
FIGS. 4A–B through 13A–B provide examples of the use of the present invention at other airplane positions.
Figure 4B:
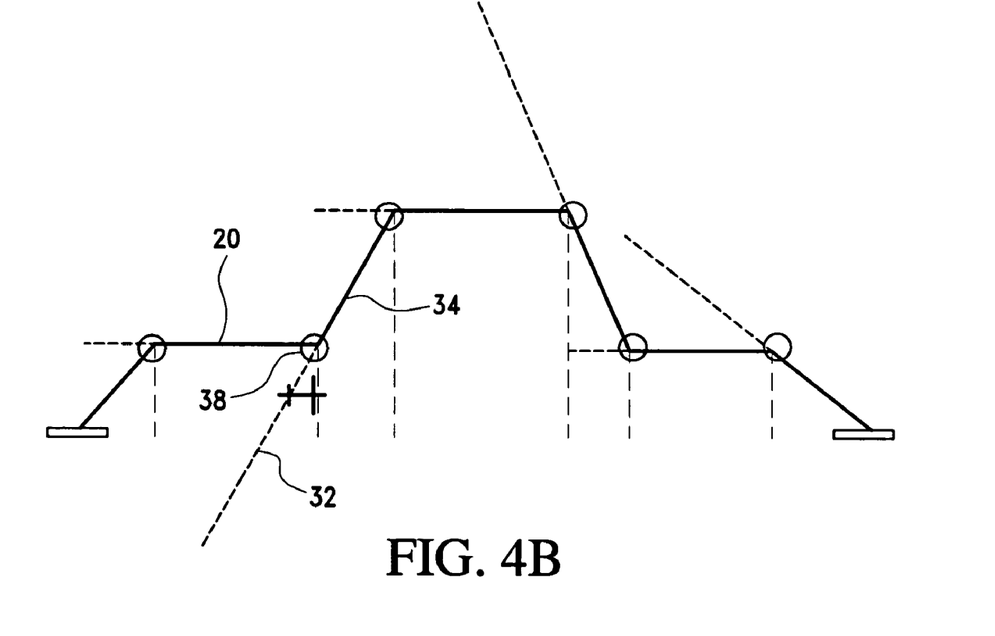

Referring now to FIGS. 4A and 4B, the airplane is level and below the current flight plan segment 20, and has also passed the next segment extension 32. Both symbols 44, 46 will now be above the airplane on the deviation indicator 10. With the next segment climbing away above the airplane, it is unlikely that the airplane will be able to cross the next waypoint at the required altitude.

Figure 5A:
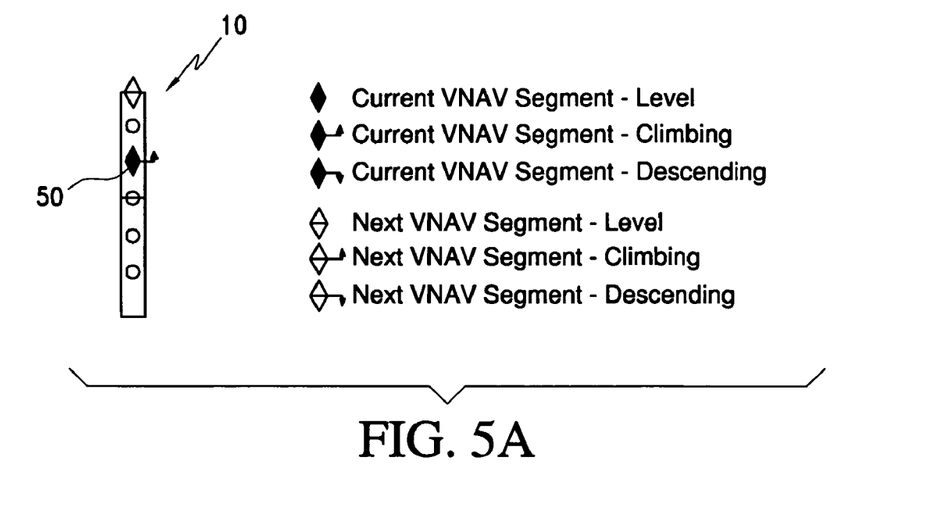
Figure 5B:
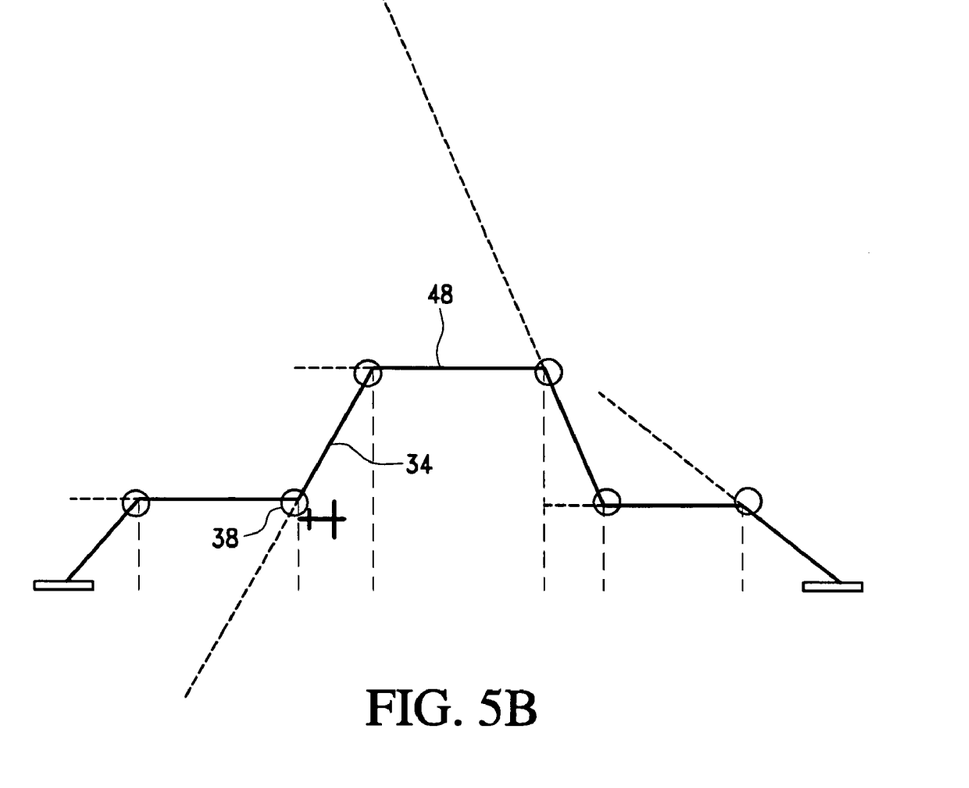
Figure 6A:
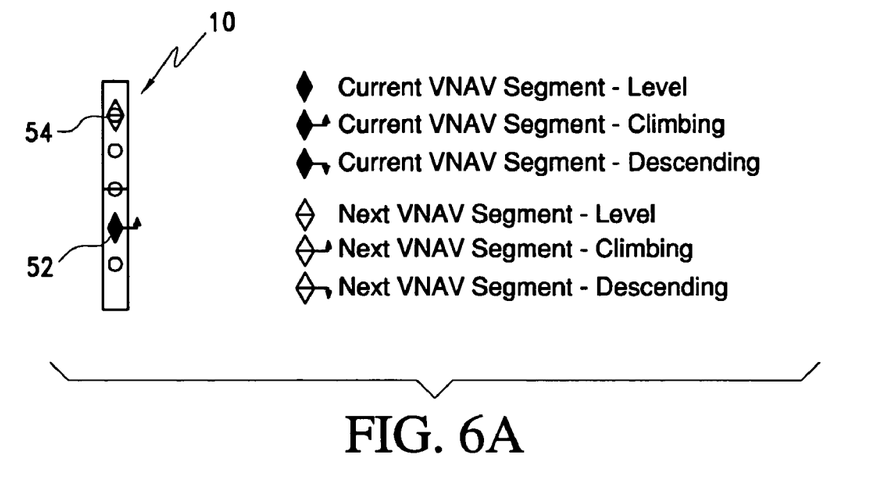
Figure 6B:
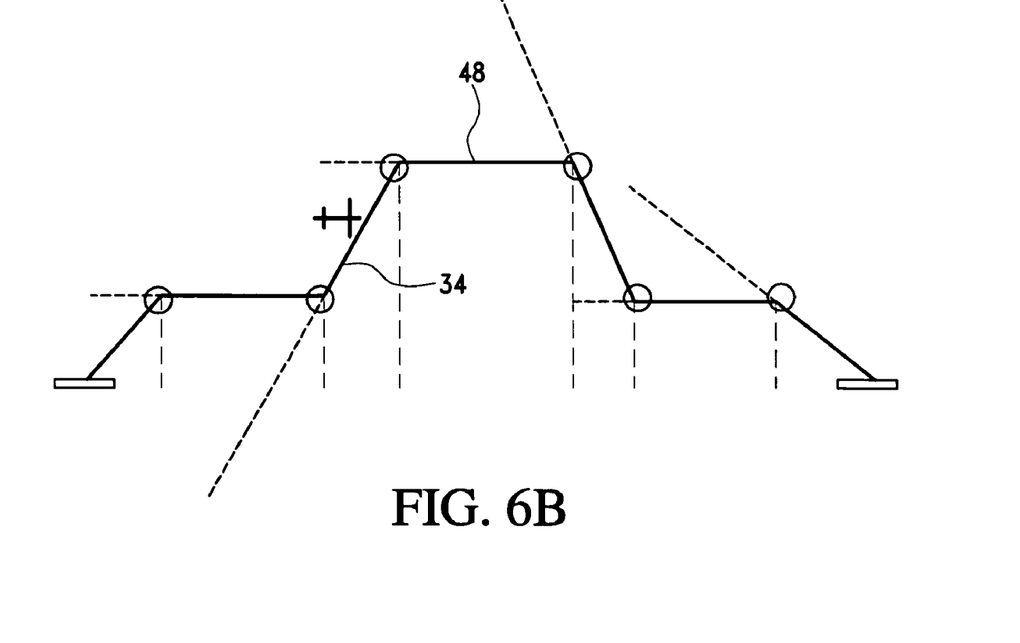

Referring now to FIGS. 5A and 5B, continuing from the previous figure, the airplane has now passed the waypoint 38, and is below the current segment 34. This segment 34 is now climbing away, with the next segment 48 level and above the airplane. If the airplane does not initiate a climb, and bring the diamond 50 down towards the center of the deviation display 10, it will not arrive at the next waypoint at the flight plan altitude, In the situation of FIG. 6A–B, the airplane has climbed above the current vertical flight plan segment 34. The deviation indicator 10 shows that the current segment 34 is below the airplane, and climbing, while the next segment 48 is above the airplane and level. If the airplane maintains a level altitude, the diamond 52 will climb to the center of the display 10, indicating the interception of the flight plan profile. If the airplane continues to climb, the non-filled diamond 54 will eventually descend to the center of the deviation display 10, at which point the airplane can level out and arrive at the next waypoint at the correct altitude.

Figure 7A:
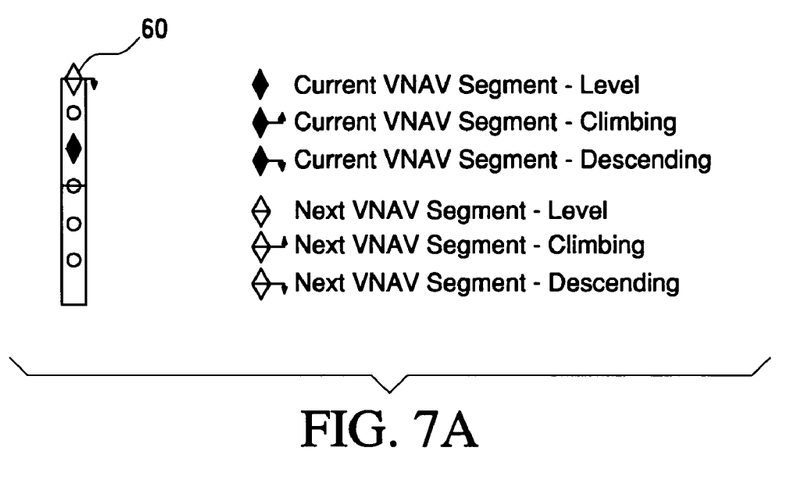
Figure 7B:
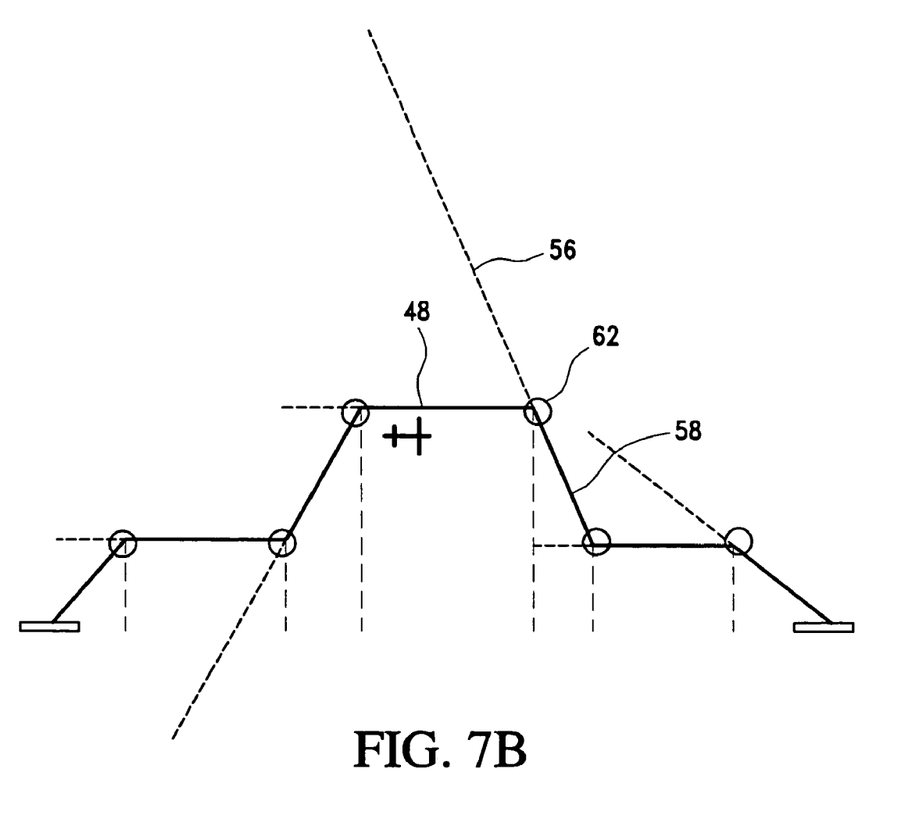

Referring now to FIGS. 7A–7B, the airplane is below the current segment 48 altitude. The extension 56 of the next segment 58 is above the airplane, and it will involve a path descent. This is indicated by the symbol 60 with the down-facing trend arrow. If it continues flying level, the airplane will not arrive at the next waypoint 62 at the planned altitude.

Figure 8A:
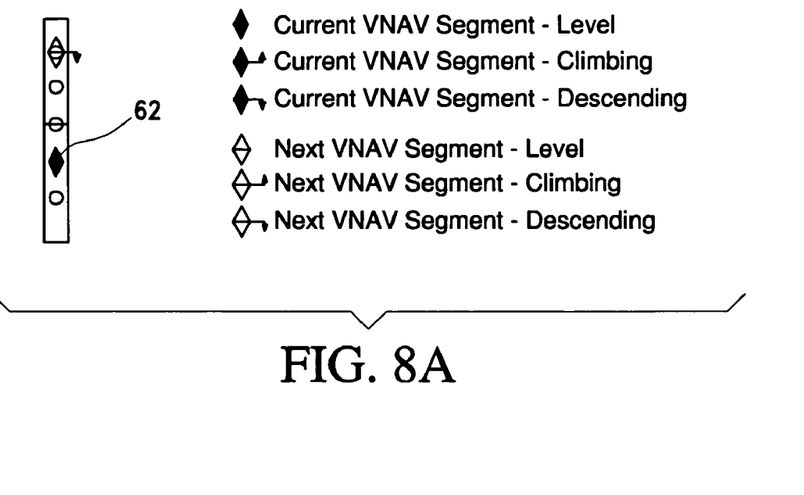
Figure 8B:
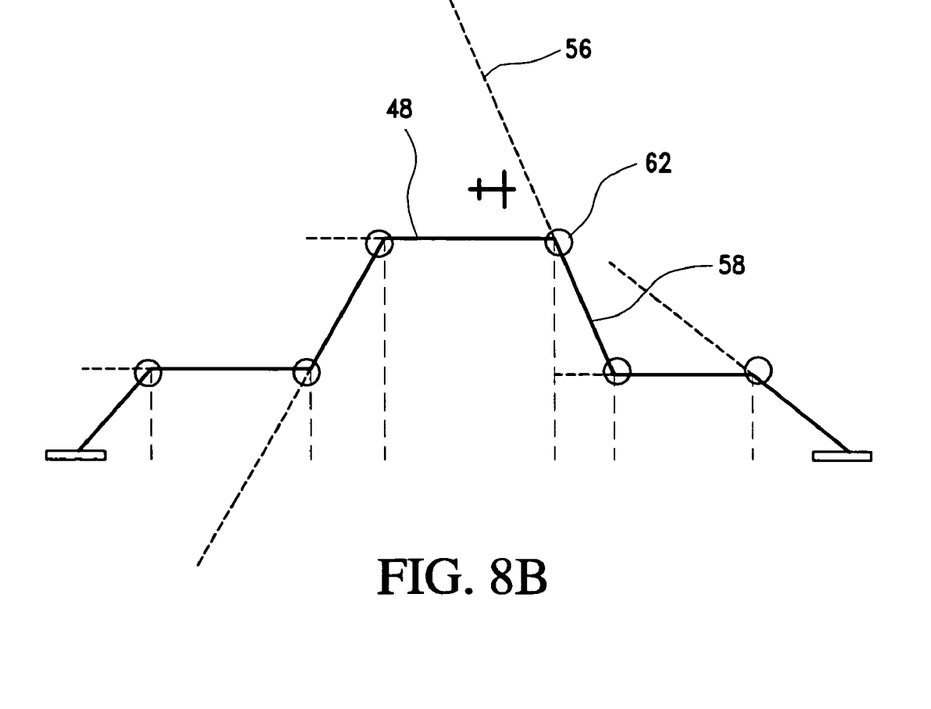

Referring now to FIGS. 8A–8B, the airplane is above the current vertical flight plan segment 48, with the next segment extension 56 above the airplane, and descending. If the airplane descends, it will be able to intercept the current segment, and proceed to the next waypoint at the requested altitude. If it continues to fly level, it will be able to intercept the extension 56 of the next segment 58 (filled diamond 62 will descend to the center of the deviation scale), and then start the path descent to arrive at the correct altitude at the next waypoint.

Figure 9A:
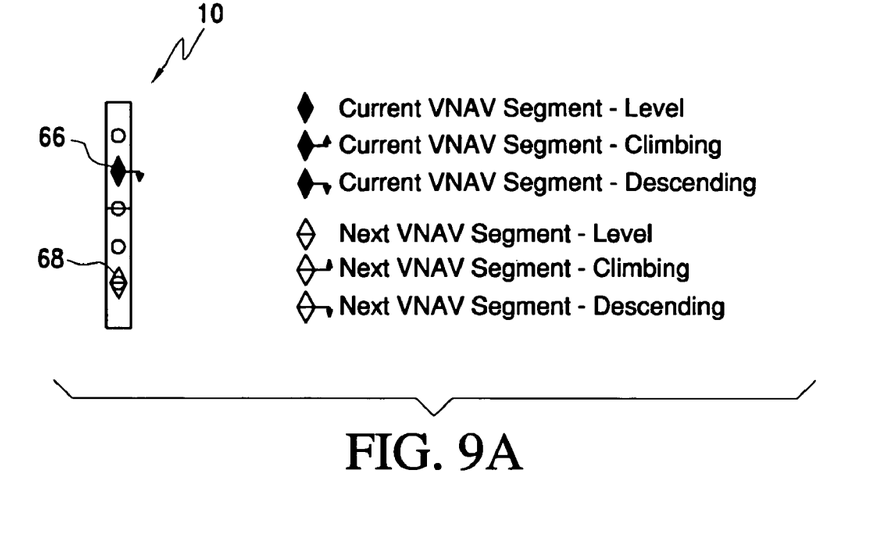
Figure 9B:
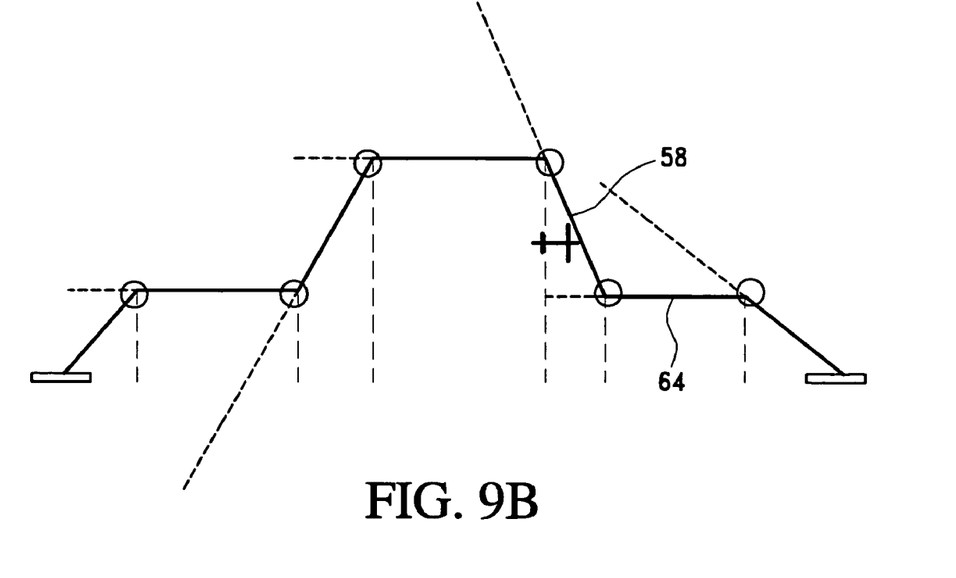

In the position of FIG. 9A–B, the airplane finds itself below the current descent segment (path) 58, with the next segment 64 below the airplane and level. If the airplane continues to fly level, it will intercept the descending path, as shown by the filled diamond 66 moving towards the center of the deviation display. Alternatively, the airplane could descend faster than required to intercept the extension of the next segment 64. In this case, the non-filled diamond 68 would gradually climb towards the center of the deviation display.

Figure 10A:
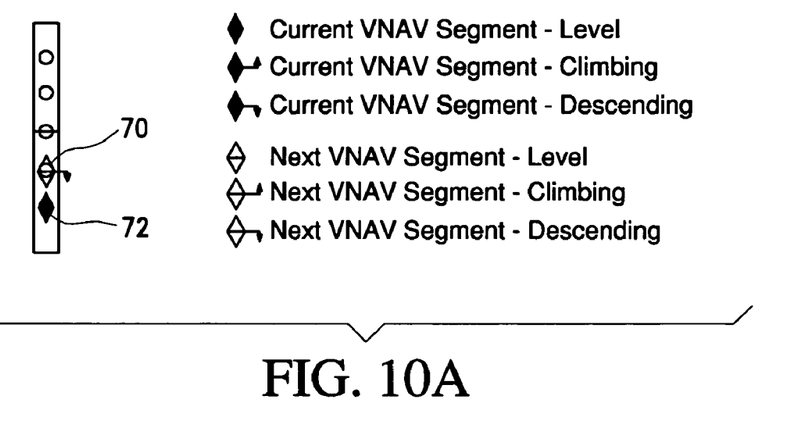
Figure 10B:
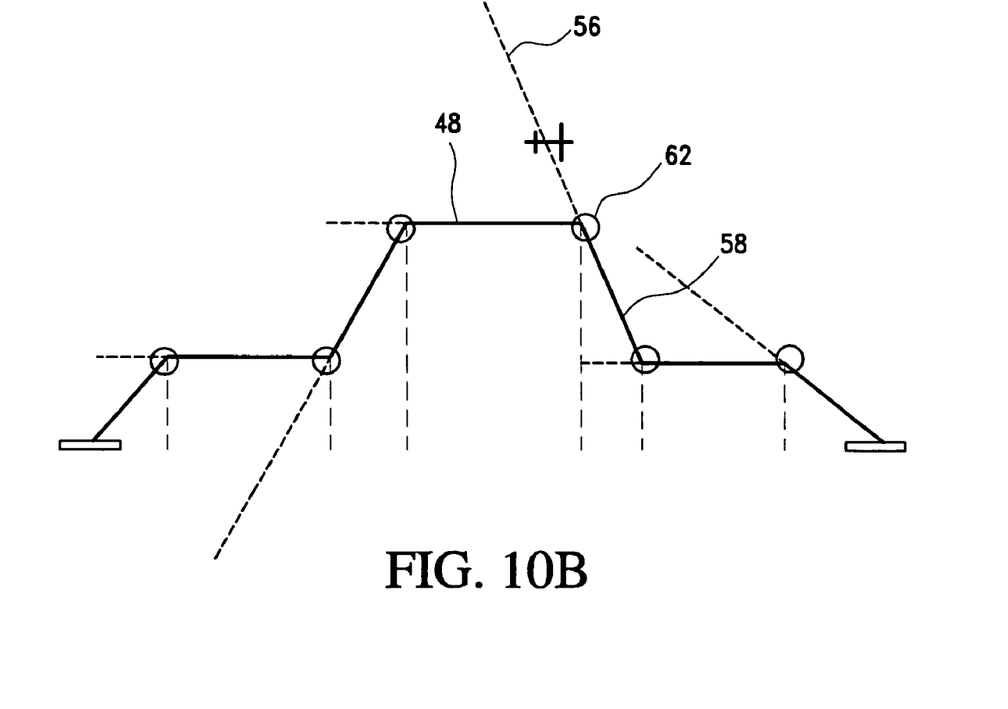

Referring now to FIG. 10A–B, the airplane is above the current flight plan altitude, and above the extension 56 of the next (descending) segment 58. Both deviation indicators 70, 72 are positioned below the center of the display; with the next segment extension 56 continuing to move lower. In this situation, the airplane will not intercept either the current path, or next segment extension 56, before reaching the next waypoint.

Figure 11A:
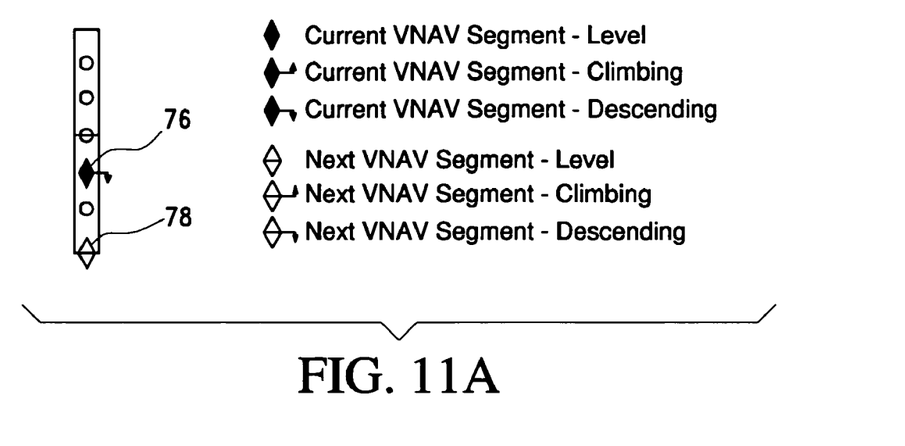
Figure 11B:
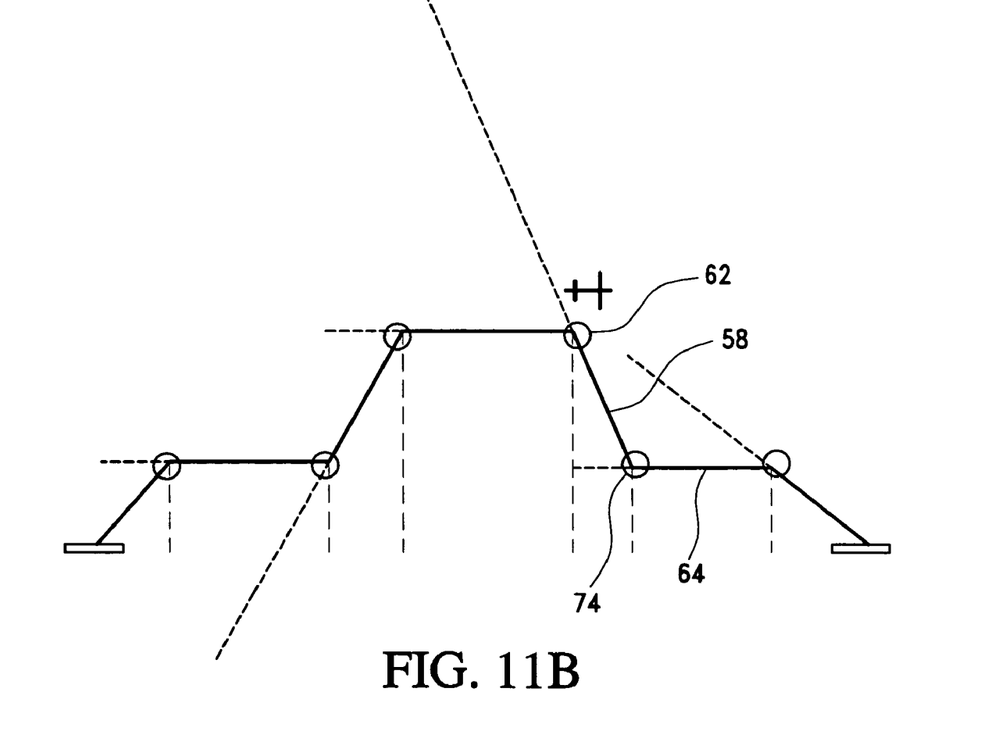

Referring now to FIG. 11A–B, continuing from the previous figure, the airplane has now passed the waypoint 62. The current segment (path) 58 is still below the airplane, and descending, with the next segment 64 also below the airplane, and level. If the airplane does not initiate a rapid descent, it will not be able to reach the next waypoint 74 at the required altitude. The symbols 76, 78 illustrate this situation.

Figure 12A:
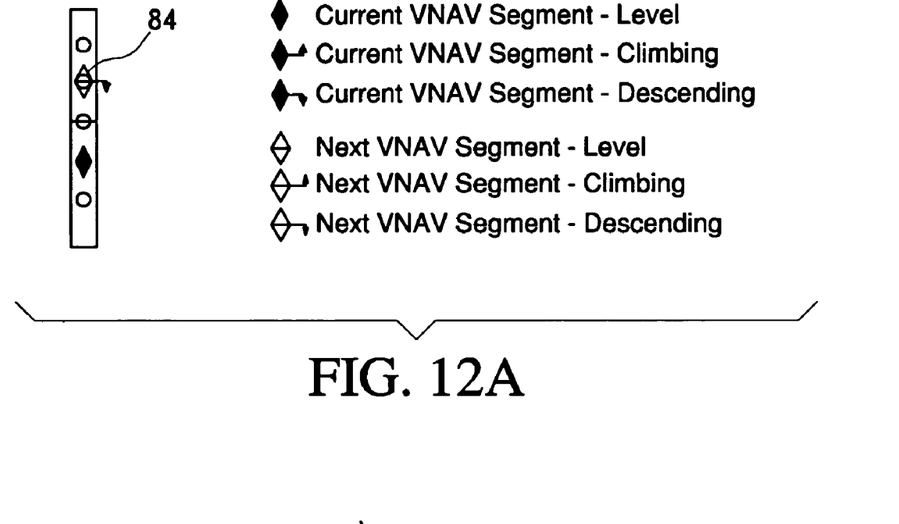
Figure 12B:
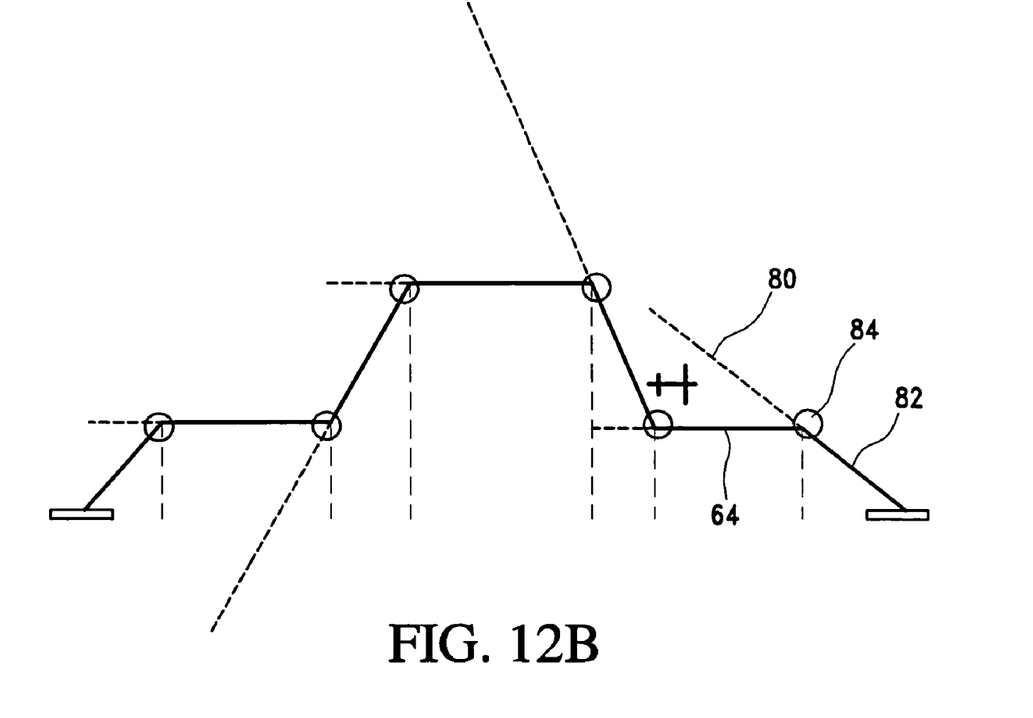

Following from the previous figures, the airplane was not able to cross the waypoint at the required altitude. Referring now to FIG. 12A–B the airplane is above the current flight plan altitude 64, but below the extension 80 of the next path segment 82. With the non-filled diamond 84 currently above the airplane, and moving towards the center, it is still possible for the airplane to intercept the extension 80 of the next path segment 82, and follow it down to cross the next waypoint 84 at the correct altitude.

Figure 13A:
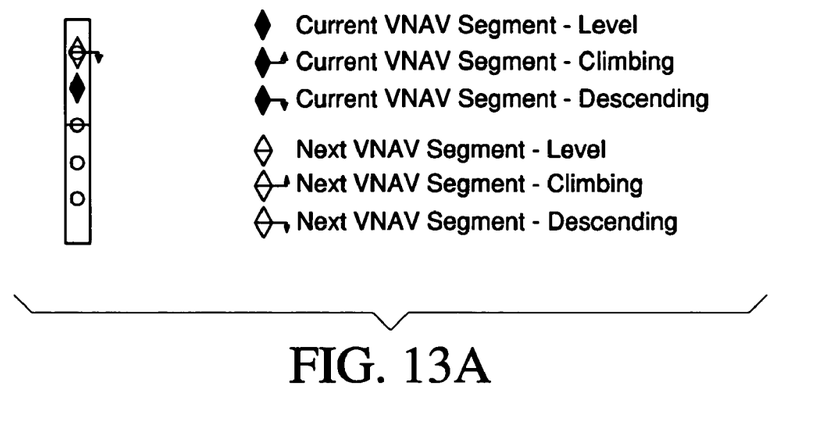
Figure 13B:
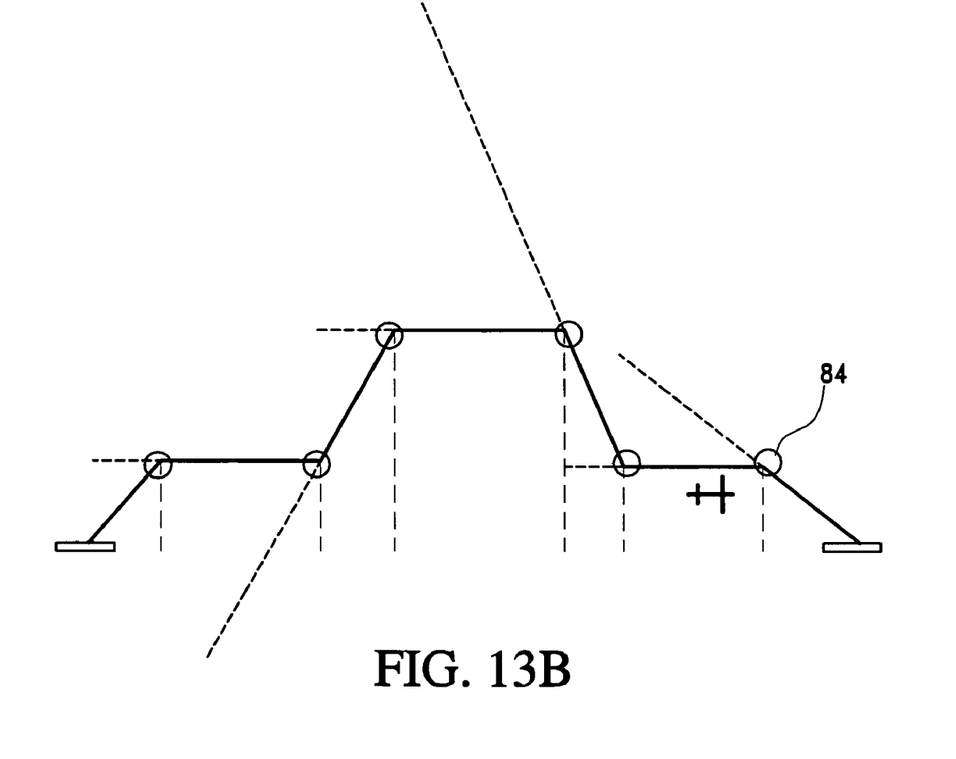

The final example illustrated by FIGS. 13A–13B shows the airplane below the current (level) path segment. The airplane could either climb, to intercept the current flight plan altitude, or remain in level flight beyond the next waypoint 84, to intercept the final path descent towards the airport.

The present invention is particularly suitable for retrofitting to existing displays (vertical deviation indicator) or for relatively low cost business/regional applications. It may serve as a forward-fit display function for systems that do not have the vertical flight profile viewer.

The aircraft Flight Management System (FMS) provides source data for the vertical deviation indicator and predictor. Such source data includes flight plan waypoints, and the calculated or constrained crossing altitudes. The software application, which can reside within or outside the FMS, can then use this data to display the vertical deviation scale.

Figure 14:
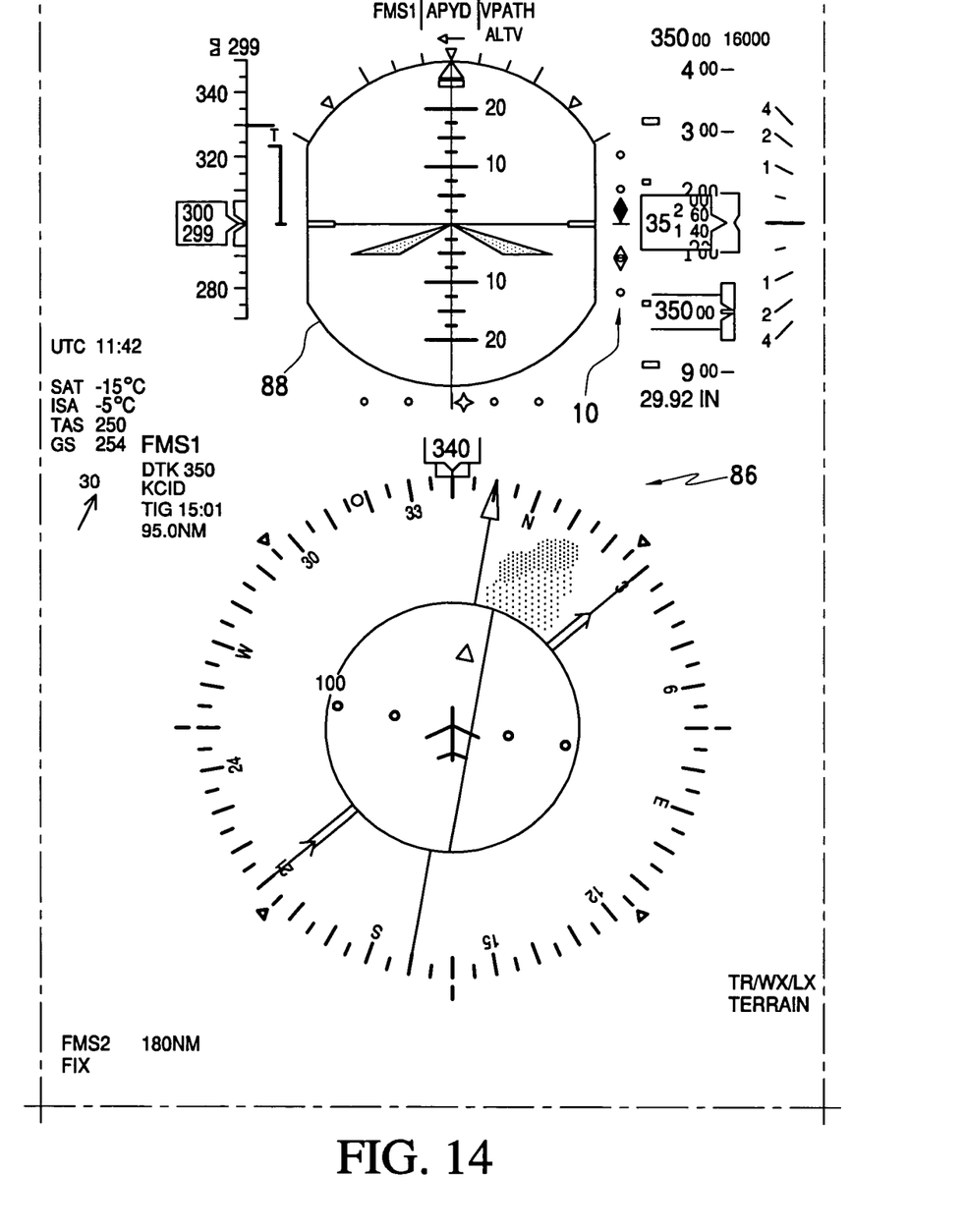
FIG. 14 is an illustration of a flight deck display system incorporating the vertical deviation indicator and predictor of the present invention.

Referring now to FIG. 14, a vertical deviation indicator and predictor 10 of the present invention is shown as how it may be integrated into a flight deck display system, designated generally as 86. In this example, the indicator and predictor 10 is shown to the right of an attitude sky/ground ball 88. The indicator and predictor are shown as diamonds.

Other embodiments and configurations may be devised without departing from the spirit of the invention and the scope of the appended claims.

The invention claimed is:

1. A vertical deviation indication and prediction system for vertical navigation situational awareness of a vehicle, comprising a vertical deviation indicator and predictor, comprising:

a vertical deviation scale comprising a plurality of vertically spaced markers, one of said markers indicating the vehicle's present vertical position;

a plurality of current vertical flight path segment symbols that are selectively superimposable over said vertical deviation scale in accordance with the vehicle's current vertical flight path segment; and, a plurality of next vertical flight path segment symbols, that are selectively superimposable over said vertical deviation scale in accordance with the vehicle's next vertical flight path segment, the position thereof being determined by backward extrapolation of said next vertical flight path segment, wherein the type and position of said current and next vertical flight path segment symbols on said vertical deviation scale provide situational awareness of the present vertical flight path deviation and an indication of an efficient and timely manner for intercepting the desired flight path.

2. The vertical deviation indication and prediction system of claim 1, wherein said marker indicating the vehicle's present vertical position is centrally positioned within said vertical deviation scale.

3. The vertical deviation indication and prediction system of claim 1 wherein said plurality of current vertical flight path segment symbols, comprises:
   a) Current VNAV Segment—Level;
   b) Current VNAV Segment—Climbing; and,
   c) Current VNAV Segment—Descending.

4. The vertical deviation indication and prediction system of claim 1 wherein said plurality of next vertical flight path segment symbols, comprises:
   a) Next VNAV Segment—Level;
   b) Next VNAV Segment—Climbing; and,
   c) Next VNAV Segment—Descending.

5. The vertical deviation indication and prediction system of claim 1 wherein said plurality of current vertical flight path segment symbols and said plurality of next vertical flight path segment symbols are each shaped as diamonds.

6. The vertical deviation indication and prediction system of claim 1 wherein said plurality of current vertical flight path segment symbols and said plurality of next vertical flight path segment symbols are each shaped as stars.

7. The vertical deviation indication and prediction system of claim 1 wherein said plurality of current vertical flight path segment symbols and said plurality of next vertical flight path segment symbols include upward trend arrows in symbols indicating climbing and downward trend arrows indicating descent.

8. The vertical deviation indication and prediction system of claim 1 wherein said plurality of current vertical flight path segment symbols are colored magenta.

9. The vertical deviation indication and prediction system of claim 1 wherein said plurality of next vertical flight path segment symbols are colored green.

10. The vertical deviation indication and prediction system of claim 1 wherein said vertical deviation scale and pluralities of current and next vertical flight path symbols are electrically displayed.

11. The vertical deviation indication and prediction system of claim 1, further including a vertical flight profile viewer, comprising:
   a graphical representation of the desired vertical flight path of the vehicle; and,
   graphical representations of backward extrapolations of each of the desired vertical flight path segments.

12. A flight deck display system for a vehicle, comprising a plurality of displays, said plurality of displays including a vertical deviation indication and prediction system, comprising:
   a vertical deviation scale comprising a plurality of vertically spaced markers, one of said markers indicating the vehicle's present vertical position;
   a plurality of current vertical flight path segment symbols that are selectively superimposable over said vertical deviation scale in accordance with the vehicle's current vertical flight path segment; and,
   a plurality of next vertical flight path segment symbols, that are selectively superimposable over said vertical deviation scale in accordance with the vehicle's next vertical flight path segment, the position thereof being determined by backward extrapolation of said next vertical flight path segment,
   wherein the type and position of said current and next vertical flight path segment symbols on said vertical deviation scale provide situational awareness of the present vertical flight path deviation and an indication of an efficient and timely manner for intercepting the desired flight path.

13. The flight deck display system of claim 12, wherein said marker indicating the vehicle's present vertical position is centrally positioned within said vertical deviation scale.

14. The flight deck display system of claim 12, wherein said plurality of current vertical flight path segment symbols, comprises:
   a) Current VNAV Segment—Level;
   b) Current VNAV Segment—Climbing; and,
   c) Current VNAV Segment—Descending.

15. The flight deck display system of claim 12, wherein said plurality of next vertical flight path segment symbols, comprises:
   a) Next VNAV Segment—Level;
   b) Next VNAV Segment—Climbing; and,
   c) Next VNAV Segment—Descending.

16. A method for providing situational awareness, comprising the steps of:
   providing a vertical deviation scale view comprising a plurality of vertically spaced markers, one of said markers indicating the vehicle's present vertical position;
   presenting, real-time, one of a plurality of current vertical flight path segment symbols that is superimposable over said vertical deviation scale in accordance with the vehicle's current vertical flight path segment; and,
   presenting, real-time, one of a plurality of next vertical flight path segment symbols, that is superimposable over said vertical deviation scale in accordance with the vehicle's next vertical flight path segment, the position thereof being determined by backward extrapolation of said next vertical flight path segment,
   wherein the type and position of said current and next vertical flight path segment symbols on said vertical deviation scale provide situational awareness of the present vertical flight path deviation and an indication of an efficient and timely manner for intercepting the desired flight path.

17. The method of claim 16, wherein said step of providing a vertical deviation scale view comprises providing said marker indicating the vehicle's present vertical position in a central position within said vertical deviation scale.

18. The method of claim 16, wherein said step of presenting one of a plurality of current vertical flight path segment symbols comprises selecting a symbol of the set comprising:
   a) Current VNAV Segment—Level;
   b) Current VNAV Segment—Climbing; and,
   c) Current VNAV Segment—Descending.

19. The method of claim 16, wherein said step of presenting one of a plurality of next vertical flight path segment symbols comprises selecting a symbol of the set comprising:
   a) Next VNAV Segment—Level;
   b) Next VNAV Segment—Climbing; and,
   c) Next VNAV Segment—Descending.

* * * * *